(12) United States Patent
Elnozahy

(10) Patent No.: US 6,879,999 B2
(45) Date of Patent: Apr. 12, 2005

(54) PROCESSING OF REQUESTS FOR STATIC OBJECTS IN A NETWORK SERVER

(75) Inventor: Elmootazbellah Nabil Elnozahy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 09/915,434

(22) Filed: Jul. 26, 2001

(65) Prior Publication Data

US 2003/0023766 A1 Jan. 30, 2003

(51) Int. Cl.[7] .................................................. G06F 9/44
(52) U.S. Cl. .................... 709/219; 707/10; 719/316
(58) Field of Search .............................. 719/310–318; 709/200–203, 230–237, 217–219, 216, 241; 707/1–10; 711/122, 133; 713/201

(56) References Cited

U.S. PATENT DOCUMENTS

| | | | | | |
|---|---|---|---|---|---|
| 5,864,852 A | * | 1/1999 | Luotonen | .................... | 713/201 |
| 5,924,116 A | * | 7/1999 | Aggarwal et al. | .......... | 711/122 |
| 5,940,594 A | * | 8/1999 | Ali et al. | .................... | 709/203 |
| 6,167,438 A | * | 12/2000 | Yates et al. | ................. | 709/216 |
| 6,256,675 B1 | * | 7/2001 | Rabinovich | ................. | 709/241 |
| 6,266,742 B1 | * | 7/2001 | Challenger et al. | ......... | 711/133 |
| 6,330,561 B1 | * | 12/2001 | Cohen et al. | ................. | 707/10 |
| 6,546,422 B1 | * | 4/2003 | Isoyama et al. | ............ | 709/225 |

* cited by examiner

*Primary Examiner*—St. John Courtenay, III
(74) *Attorney, Agent, or Firm*—Joseph P. Lally; Casimer K. Salys

(57) ABSTRACT

A method and system for responding to requests for static web documents including saving the response as a packet train comprising one or more IP compliant packets. Upon a subsequent request for the static web document, the saved packet train may be retrieved and the header information updated. In this manner, the network protocol processing required to respond to the request is reduced. The server may include code for determining whether a referenced web object is a static object and a directory of recently accessed static web objects and a copy of the corresponding packet trains. The web server may be configured to consult the directory to determine if an object is a static object that has been recently accessed. If the object has been recently accessed, the server may retrieve the corresponding packet train from its system memory or from disk and update the packet headers prior to transmission.

30 Claims, 3 Drawing Sheets

PROCESSING OF REQUESTS FOR STATIC OBJECTS IN A NETWORK SERVER

BACKGROUND

1. Field of the Present Invention

The present invention generally relates to the field of networked computing and more particularly to a method and system to improve server performance by handling static objects as special cases requiring reduced network processing.

2. History of Related Art

In the field of data processing networks, it is becoming increasingly common to provide services via servers or server systems that are accessible over a network. For purposes of this disclosure, a server system refers to a cluster in which a set of microprocessor-based server devices are connected on a local area network (LAN) to provide a common set of services to client applications. Cost consideration may frequently motivate the manufacturers and purchasers of servers to implement the servers with less than state-of-the-art technology and with a minimum of peripheral components. In a common implementation, for example, server clusters are designed as a set of diskless server devices that share disk storage via some form of networked storage whether it be a network attached storage (NAS) device or a storage area network (SAN).

Clients access servers generally in two modes, namely data retrieval and data updates. In data retrieval accesses, the subject of this disclosure, it is conceivable that execution may be dominated by network processing in which information is made suitable for transport across the network from a server to a client (or vice versa). The devices attached to a network must use a common protocol or set of protocols to transfer information. Network protocols are typically described in terms of protocol "layers", where each layer of processing is related to a specific function. The Open Systems Interconnect (OSI) working group of the International Standards Organization (ISO) has distributed a widely recognized model (the OSI Reference Model) of a prototypical network. The OSI Reference Model describes a seven-layer network protocol, from the physical layer comprising the physical medium and the actual electrical signals of a network, to the application layer that acts as an interface between the network and application processes such as email.

Perhaps the most widely implemented network protocol is the suite of protocols commonly referred to as the Transmission Control Protocol/Internet Protocol (TCP/IP). TCP/IP provides the network backbone for a large number of data processing networks including the Internet. Each client and/or server connected to the Internet (or other TCP/IP compliant network) must include TCP/IP code that converts datagrams or packets transmitted over the network to a stream of bytes interpretable by an application process. Conversely, each network agent must be able to convert application information into a set of one or more packets suitable for transporting across the network. Packets are thus required to traverse the protocol "stack" of layers twice during each transaction, once as they descend the stack (from application layer to physical layer) at the source and again as they ascend the stack (from physical layer to application layer) at the destination.

Full TCP/IP processing of each network object can be time consuming and processor intensive. Generating and checking checksums to facilitate error detection, allocating and deallocating memory for requested objects, packet framing and deframing, data copying, general protocol processing, and other required tasks can place a performance limiting load on the server cluster. It would therefore be desirable to reduce the amount of network processing required of servers that use widely implemented protocols stacks like TCP/IP.

Data objects that are retrieved by clients may be broadly classified into static objects and dynamic objects. Static objects are objects or files that are filly self-contained and change infrequently. For instance, a static Web page is typically available as a file that need not be generated at request time by the server. Also, once the Web page is generated, it is typically available under the same Universal Resource Identifier (URI) and rarely changes thereafter. To serve static objects in response to a client's data retrieval request, the server typically reads the object from its persistent or volatile storage, formats it into one or more network packets according to TCP/IP, and sends it to the client over the network. Thus, in a conventionally implemented server, static objects incur substantial overhead in network processing. If a static object is repeatedly accessed by clients in data retrieval mode, as is common in Web and file servers, the same amount of network processing is repeatedly applied even though the resulting object does not usually vary from one instance to the next. With the exception of the destination Internet address and some other minor protocol-related information, a packet generated from a static object is essentially the same each time it is generated. Because static objects represent an appreciable percentage of installed web pages, it would be desirable to implement a method and system in which the network processing of static objects is substantially reduced.

SUMMARY OF THE INVENTION

The problems identified above are in large part addressed by a method and system for storing static objects, including Hypertext Transfer Protocol (HTTP) documents, in the form of a one or more IP-compliant packet trains in memory or on disk. Upon subsequent access to a static object, the saved packet train may be retrieved from memory or from disk and the subsequent network processing would merely require some updating of header information. In this manner, a significant portion of the network protocol processing may be eliminated when static objects are referenced frequently. In one embodiment, the server would include code for determining whether a referenced object is a static object. The server may further include a directory of recently accessed static objects and a copy of the packet trains corresponding to these recently accessed objects. The server is preferably configured to consult the directory to determine if an object is static and if it has been recently accessed. If the object has been recently accessed, the server may retrieve the corresponding packet(s) from its system memory, otherwise the server retrieves said packets from disk. Following retrieval of the packets, the server may update certain header fields of the packet to reflect the current request. With the updated header information the packet train is then suitable for transmission over the network as a response to the client's request. It should be appreciated by those skilled in the art having the benefit of the disclosure that if the packets exist in memory, then the processing required by this method does not entail memory allocation, packet construction, data copying, or heavyweight protocol processing such as computing checksums or manipulating sockets.

BRIEF DESCRIPTION OF THE DRAWINGS

Other objects and advantages of the invention will become apparent upon reading the following detailed description and upon reference to the accompanying drawings in which.

Figure 1:
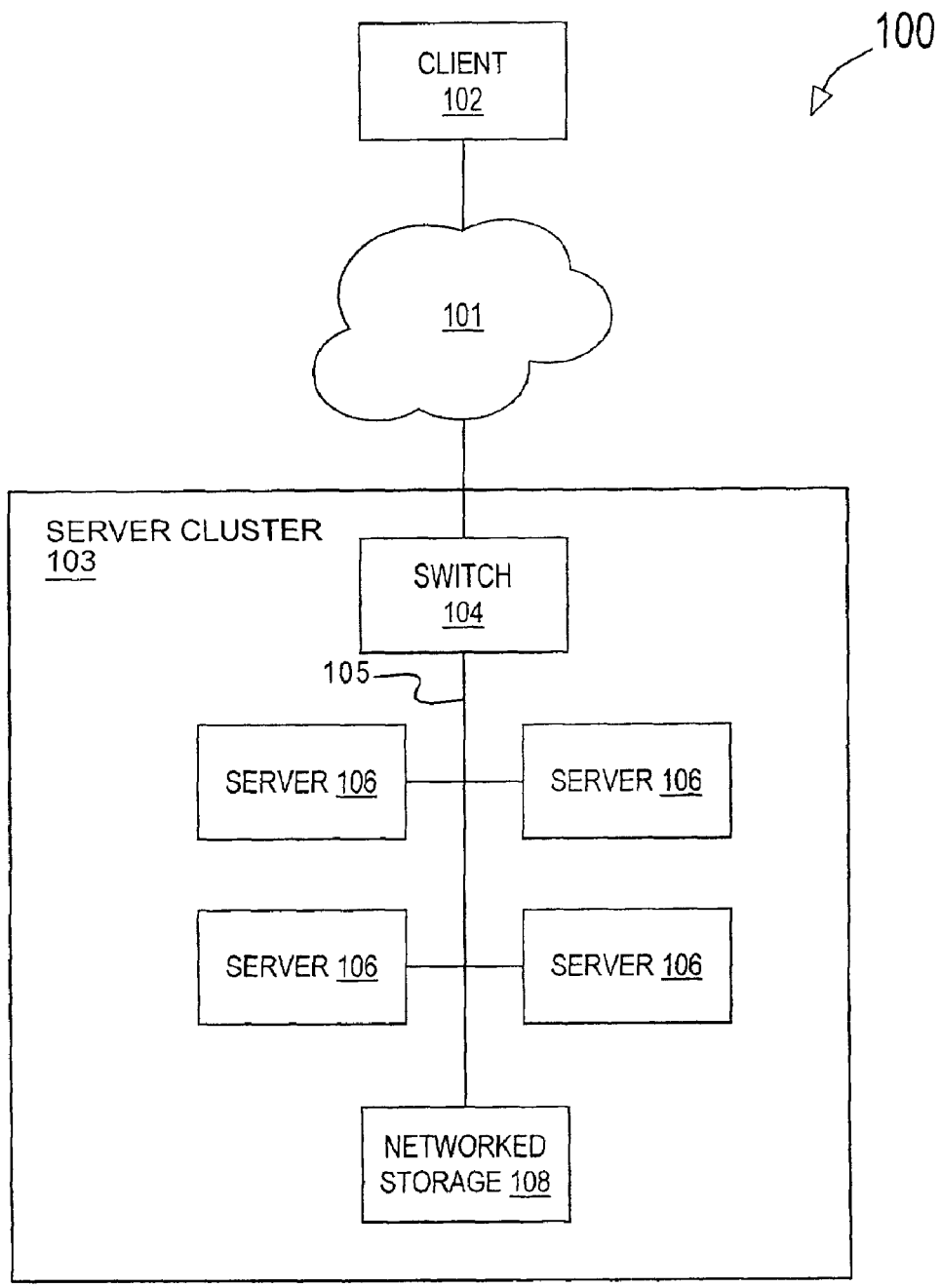
FIG. 1 is a block diagram of selected components of a data processing network according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 depicts selected elements of a data processing network 100 according to one embodiment of the invention. In the depicted embodiment, network 100 includes a client 102 connected to a server cluster 103 through a network interconnection 101. Client 102 typically includes a client application program such as a web browser or the like running on a client device. Suitable client devices include desktop and laptop personal computers, network (diskless) computers and workstations, and other network aware devices including Internet enabled phones and personal digital assistants (PDAs).

Network interconnection 101 may represent a wide area network (WAN) such as the Internet that includes a plurality of network devices including appropriate switches, routers, hubs etc., as well as the connecting media whether it is copper cable, optical fiber cable, or a wireless medium. Typically, each device or network connected to network interconnection 101 complies with and includes driver routines for a standardized network communication protocol. In a widely applicable embodiment in which network interconnection 101 represents the Internet, for example, each of the connected devices and networks is TCP/IP compliant.

Server cluster 103 as depicted in FIG. 1 is representative of a dense server configuration suitable for providing services to the Internet community. Server cluster 103 includes a switch 104 that interfaces a number of server devices 106 to the network interconnection 101. Each of the servers 106 is connected to switch 106 through a local area network (LAN) 105. LAN 105 is typically implemented with high speed Ethernet although the invention is suitable for use with a variety of LAN implementations.

In the depicted embodiment, LAN 105 includes networked storage 108 that represents a non-volatile, mass storage facility available to each server 106 in cluster 103. Networked storage 108 typically includes one or more Network Attached Storage (NAS) devices, a fibre channel Storage Area Network (SAN), or a combination thereof. In one embodiment, servers 106 may be implemented without a non-volatile storage device (i.e., hard disk) to minimize cluster cost.

In the depicted embodiment, client 102 may issue client requests to server cluster 103 via network interconnection 101. The client request is received by server cluster 103 and routed to an appropriate server 106 by switch 104. The server 106 interprets the client request and generally issues a response back to client 102. A common example of such a sequence occurs when the user of client 102 selects a web address with a web browser. The browser generates an HTTP formatted GET request identifying the selected web address. The TCP/IP drivers on client 102 process the HTTP request to produce a network compliant packet or set of packets that includes a network address (e.g., an IP address) of server cluster 103. The packet(s) are then routed to server cluster 103 and directed to a server 106 by switch 104.

Figure 2:
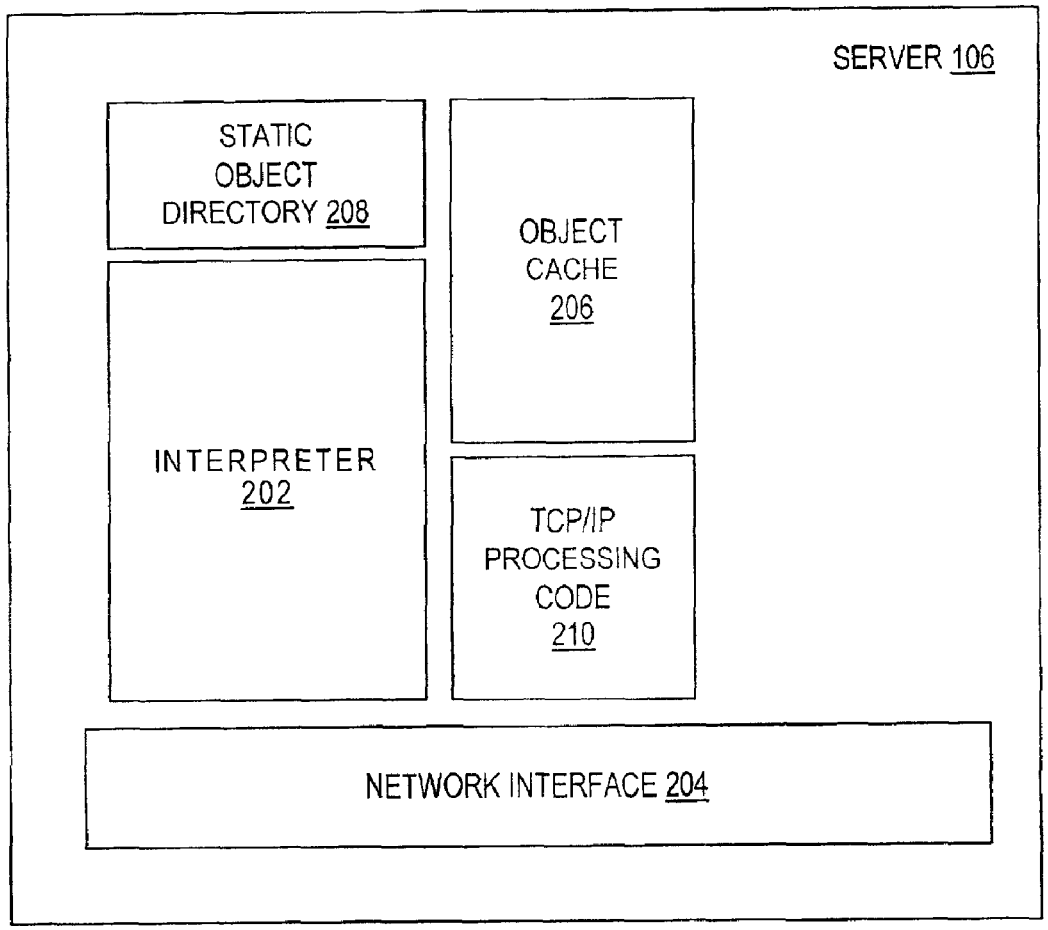
FIG. 2 is a conceptual diagram of an object database according to one embodiment of the invention.

Referring now to FIG. 2, selected elements of server 106 according to one embodiment of the invention are depicted. It is to be understood that selected features of network 100, client 102, and server 106 may be implemented as a set of computer executable instructions (software). Such software may be stored in a computer readable medium including volatile mediums such as the system memory (DRAM) or cache memory (SRAM) of server 106 as well as non-volatile mediums such as a magnetic hard disk, floppy diskette, CD ROM, flash memory card, DVD, magnetic tape, and the like.

As depicted in FIG. 2, server 106 includes an interpreter 202, which processes client requests and generates the corresponding responses. In one embodiment, interpreter 202 includes an HTTP interpreter capable of processing HTTP formatted client requests. Furthermore, in one embodiment interpreter 202 may be implemented as an application-level process for maintainability, or it may be implemented as a kernel-level process for high performance.

Interpreter 202 works in conjunction with a network interface 204 and network processing code 210 to receive requests and send responses through network interconnection 101 (through, in turn, local area network 105 and switch 104). Network processing code 210 may include the operating system's TCP/IP routines that transform application level messages (requests and responses) into network packets and vice versa. Network processing code 210 may include portions of the operating system kernel code. Typically, it is desirable to access or invoke kernel code as seldom as possible because of the extensive context state that must be saved when a processor switches from executing user code to protected code. The present invention contemplates a reduction in context switching for selected types of requested objects.

Interpreter 202 according to one embodiment of the invention is configured to determine when a requested object is a static object. For purposes of this disclosure, a static object refers to an object that is time invariant. In other words, a request for a static object always generates the same responsive content. Because static objects, including static HTTP documents, represent a significant portion of the content that is accessible via the Internet, a method of handling requests for such documents that improved response time may result in an appreciable improvement in overall network performance.

Server 106 includes a static object directory 208. Interpreter 202 uses the information stored in static object directory 208 to determine if the requested object is static, and if so, whether pre-formatted packets corresponding to the requested object have been previously generated. If the packets have been previously generated, interpreter uses the static object directory information to determine the location of the pre-formatted packets corresponding to the object reside (e.g., local memory, local disk, or on network storage 108). If the information in directory 208 indicates that the requested object is static but requires processing to generate the pre-formatted packets, interpreter 202 retrieves the requested object from an object cache 206 or, if the object is not available in cache 206, from disk storage. After the object has been retrieved, interpreter 202 invokes network processing code 210 to generate a response in the form of a network compliant packet or set of packets (packet train) suitable for transmission to client 102.

Upon constructing a response to a request for a static object, interpreter 202 may store the constructed packets locally (or on disk) as a separate entity referred to herein as a form of a response to a request for the object. Interpreter 202 may then update static object directory 208 to reflect that a form response containing the corresponding object exists and to indicate its location. The form response or pre-formatted packet train may then be retrieved when the object is subsequently requested by another client. By retrieving the form response, server 102 can bypass or reduce time-consuming network protocol processing and improve overall response performance.

Although the content of a static object does not vary from one request to the next, the network packets that carry the content may vary. More specifically, the network protocol processing performed by network interface 204 and processing code 210 typically includes appending various headers to the underlying content (the payload) where the headers contain information needed or desirable to send the information across the network to the correct destination. These headers may include, for example, the IP address of the requesting client and a time stamp. While the content of a static object is invariant, the header field values may vary with each request for the object.

To address this contingency, interpreter 202 may include code that updates a form response to produce correct header values for the current request. This header processing is significantly less time consuming than the fully general network processing that occurs when a response is generated from scratch. For instance, fully general network processing of a static HTTP object would include the computation of a checksum based on the content of the requested object, the allocation of (and eventual deallocation of) memory to store the packet, copying the data from the object cache into the allocated memory, formatting the packets according to the protocol requirement, and the setting up of appropriate scatter/gather buffers. Scatter/gather is used to do Direct Memory Access (DMA) transfers of data that is written to noncontiguous areas of memory. Scatter/gather buffers are a list of vectors, each of which gives the location and length of one segment of the requested object.

In one embodiment, interpreter 202 inserts one or more blank application layer header fields into the form response. When interpreter 202 processes a request, it can update the application layer header fields to reflect the current request. The response header fields allow server 106 to pass information about the response that cannot be placed in the response status line. These header fields give information about server 106 and about further access to the requested object. HTTP supports a finite set of response header fields as outlined in the HTTP specification from the Internet Engineering Task Force (IETF). See, *Hypertext Transfer Protocol—HTTP* 1.1, RFC 2616 (IETF 1999). The HTTP response header fields may include an Accept-Range header field, Age header field, ETag header field, Location header field, Proxy-Authenticate header field, Retry-After header field, Server header field, Vary header field, WWW-Authenticate header field, as well as additional general header fields. By inserting one or more blank header fields in the form response, server 106 and interpreter 202 are able to take advantage of the pre-processing of packets as described while retaining flexibility to insert response-specific application header fields. If a response requires more header fields than are provided by the form response, interpreter 202 may opt to construct the response in the conventional manner using fully general network protocol processing.

Figure 3:
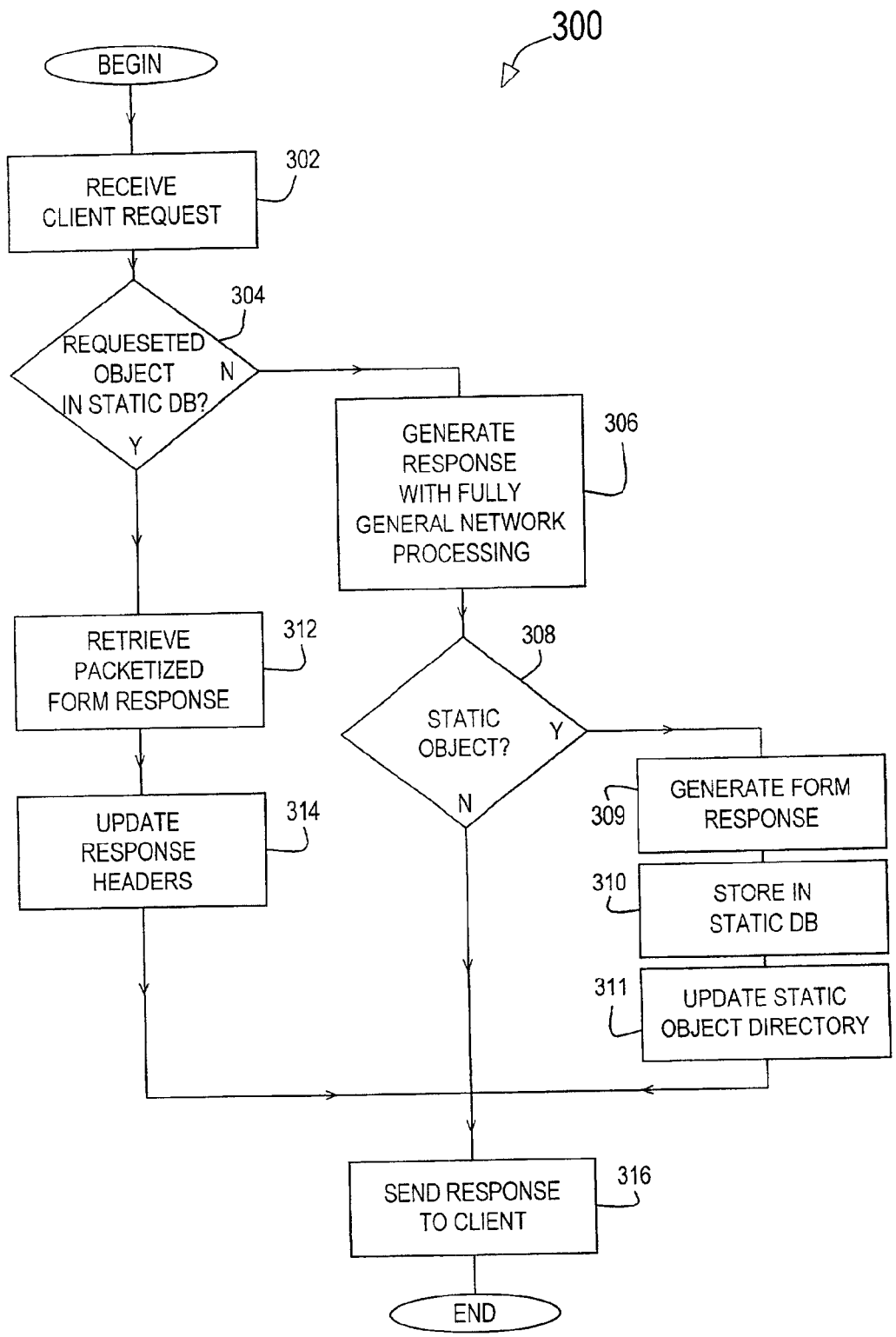
FIG. 3 is a flow diagram of a method for responding to client requests on a server according to one embodiment of the invention.

FIG. 3 presents a flow diagram illustrating a method 300 of responding to a client request for a specific object in a data processing network. In the depicted embodiment, server 106 receives a client request (block 302). The server device determines (block 304) whether a form of a response containing the requested object is available to the server. If no such representation of the response is available, a response comprising a set of one or more packets is generated (block 306) using fully general network protocol processing including the allocation of memory for the generated response, appropriate data copying, packet formatting, and the calculation of an appropriate checksum. In addition, the interpreter will determine (block 308) whether the requested object is a static object. If the requested object is determined to be a static object, a form response is generated (block 309) from the packetized response. Generating the form response may include inserting one or more blank header fields into the formatted packets. The form response is then stored (block 310) in the static object database as a set of pre-formatted packets available for subsequent requests. The static object directory is then updated (block 311) to include a reference to the form response thereby enabling subsequent request to locate and access the form.

If the interpreter determines in block 304 by searching the static object database that an appropriate form response has been previously generated, the form response is located using the static object database and retrieved (block 312). The interpreter may then update (block 314) appropriate headers in the form response where the effort required to update the response headers is significantly less than the fully general network protocol processing that would otherwise occur. Ultimately, the response, whether generated from a form response or from scratch, is transmitted (block 316) to the client. By storing the responses generated for static objects for subsequent re-use the present invention improves response performance for a potentially significant portion of the client requests, e.g. client requests for static HTTP web pages.

It will be apparent to those skilled in the art having the benefit of this disclosure that the present invention contemplates a method and system for storing the responses generated for static objects including static HTTP pages for subsequent re-use to reduce network processing on subsequent requests for these objects. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method for responding to a client request for an object in a data processing network, comprising:

determining whether the requested object is a static object;

upon determining that the requested object is a static object, determining whether a static object form response corresponding to the static object is available;

responsive to determining that a form response is available, updating a header in the form response based on the client request;

responsive to determining that a form response is not available:

generating a response to the client request by retrieving the requested object and performing network protocol processing on the retrieved object;

generating a form response indicative of the generated response; and storing the form response for use in responding to a subsequent request for the object.

2. The method of claim 1, wherein generating the request response comprises generating a set of packets formatted according to a network protocol.

3. The method of claim 2, wherein the network protocol is a TCP/IP protocol.

4. The method of claim 2, wherein the generating the form response further includes inserting at least one blank header field into the set of packets.

5. The method of claim 1, wherein determining whether a form response is available includes accessing a static object directory indicative of the contents of a static object database, wherein the static object database contains static objects exclusively.

6. The method of claim 5, wherein storing the form response comprises storing the form response in the static object database and updating the static object directory to reflect the inclusion of the form response in the database.

7. The method of claim 6, wherein at least a portion of the static object database is stored in main memory.

8. The method of claim 6, wherein at least a portion of the static object database is stored on disk.

9. The method of claim 1, further comprising, responsive to a subsequent request for the object, generating a response to the subsequent request from the form response.

10. The method of claim 9, wherein generating the subsequent response includes updating header fields of the form response.

11. A computer program product residing on a computer readable medium for responding to a client request for an object in a data processing network, comprising:

computer code means for determining whether a static object form response corresponding to the requested object is available;

computer code means for updating a header in the form response based on the client request responsive to determining that a form response is available;

responsive to determining that a form response is not available:

computer code means for generating a response to the client request by retrieving the requested object and performing network protocol processing on the retrieved object to generate header fields and header fields to the requested object;

generating a form response indicative of the generated response, wherein the form response includes the generated header fields; and computer code means for storing the form response for use in responding to a subsequent request for the object.

12. The computer program product of claim 11, wherein generating the request response comprises generating a set of packets formatted according to a network protocol.

13. The computer program product of claim 12, wherein the network protocol is a TCP/IP protocol.

14. The computer program product of claim 12, wherein the generating the form response further includes inserting at least one blank header field into the set of packets.

15. The computer program product of claim 11, wherein determining whether a form response is available includes accessing a static object directory indicative of the contents of a static object database.

16. The computer program product of claim 15, wherein storing the farm response comprises storing the form response in the static object database and updating the static object directory to reflect the inclusion of the form response in the database.

17. The computer program product of claim 16, wherein at least a portion of the static object database is stored in main memory.

18. The computer program product of claim 16, wherein at least a portion of the static object database is stored on disk.

19. The computer program product of claim 11, further comprising, responsive to a subsequent request for the object, generating a response to the subsequent request from the form response.

20. The computer program product of claim 19, wherein generating the subsequent response includes updating header fields of the form response.

21. A server suitable for use in a data processing network, the sever including processor, storage, and input/output means, the storage containing server executable instructions for responding to a client request for an object, comprising:

computer code moans far determining whether a static object form response corresponding to the requested object is available;

computer code means for updating a header in the form response based on the client request responsive to determining that a form response is available;

responsive to determining that a form response is not available:

computer code means for generating a response to the client request by retrieving the requested object and performing network protocol processing on the retrieved object;

computer code means for generating a form response indicative of the generated response; and computer code means for storing the form response for use in responding to a subsequent request for the object.

22. The server of claim 21, wherein generating the request response comprises generating a set of packets formatted according to a network protocol.

23. The server of claim 22, wherein the network protocol is a TCP/IP protocol.

24. The server of claim 22, wherein the generating the form response further includes inserting at least one blank header field into the set of packets.

25. The server of claim 21, wherein determining whether a form response is available includes accessing a static object directory indicative of the contents of a static object database.

26. The server of claim 25, wherein storing the form response comprises storing the form response in the static object database and updating the static object directory to reflect the inclusion of the form response in the database.

27. The server of claim 26, wherein at least a portion of the static object database is stored in main memory.

28. The server of claim 26, wherein at least a portion of the static object database is stored on disk.

29. The server of claim 21, further comprising, responsive to a subsequent request for the object, generating a response to the subsequent request from the form response.

30. The server of claim 29, wherein generating the subsequent response includes updating header fields of the form response.

* * * * *

UNITED STATES PATENT AND TRADEMARK OFFICE
CERTIFICATE OF CORRECTION

PATENT NO. : 6,879,999 B2
DATED : April 12, 2005
INVENTOR(S) : Elmootazbellah Nabil Elnozahy It is certified that error appears in the above-identified patent and that said Letters Patent is hereby corrected as shown below:

Column 7,
Line 34, claim 11 should read as follows:
11. A computer program product residing on a computer readable medium for responding to a client request for an object in a data processing network, comprising:

computer code means for determining whether a static object form response corresponding to the requested object is available;

computer code means for updating a header in the form response based on the client request responsive to determining that a form response is available:

responsive to determining that a form response is not available:

computer code means for generating a response to the client request by retrieving the requested object and performing network protocol processing on the retrieved object to generate header fields and append the header fields to the requested object;

generating a form response indicative of the generated response, wherein the form response includes the generated header fields; and computer code means for storing the form response for use in responding to a subsequent request for the object.

Column 8,
Line 19, claim 21 should read as follows:
21. A server suitable for use in a data processing network, the server including processor, storage, and input/output means, the storage containing server executable instructions for responding to a client request for an object, comprising:

computer code means for determining whether a static object form response corresponding to the requested object is available;

computer code means for updating a header in the form response based on the client request responsive to determining that a form response is available;

responsive to determining that a form response is not available:

UNITED STATES PATENT AND TRADEMARK OFFICE
CERTIFICATE OF CORRECTION

PATENT NO. : 6,879,999 B2
DATED : April 12, 2005
INVENTOR(S) : Elmootazbellah Nabil Elnozahy It is certified that error appears in the above-identified patent and that said Letters Patent is hereby corrected as shown below:

<u>Column 8 (cont'd)</u>,
    computer code means for generating a response to the client request by retrieving the requested object and performing network protocol processing on the retrieved object;

computer code means for generating a form response indicative of the generated response; and computer code means for storing the form response for use in responding to a subsequent request for the object.

Signed and Sealed this

Fifth Day of July, 2005

JON W. DUDAS
*Director of the United States Patent and Trademark Office*